United States Patent
Binder et al.

(10) Patent No.: US 8,740,281 B2
(45) Date of Patent: Jun. 3, 2014

(54) MOTOR VEHICLE HAVING A MECHANISM FOR MOVING A PANEL OR DOOR

(75) Inventors: Franz Binder, Lenting (DE); Jürgen Sendtner, Denkendorf-Zandt (DE); Franz Sinseder, Dorfen (DE); Manfred Schindler, Markt Schwaben (DE); Knut Bartsch, Ebersberg (DE)

(73) Assignee: Audi AG, Ingolstadt (DE)

( * ) Notice: Subject to any disclaimer, the term of this patent is extended or adjusted under 35 U.S.C. 154(b) by 259 days.

(21) Appl. No.: 13/062,062

(22) PCT Filed: Aug. 14, 2009

(86) PCT No.: PCT/EP2009/005913
§ 371 (c)(1),
(2), (4) Date: Mar. 3, 2011

(87) PCT Pub. No.: WO2010/025817
PCT Pub. Date: Mar. 11, 2010

(65) Prior Publication Data
US 2011/0162282 A1 Jul. 7, 2011

(30) Foreign Application Priority Data

Sep. 4, 2008 (DE) .......................... 10 2008 045 892
Dec. 10, 2008 (DE) .......................... 10 2008 061 395
Jul. 3, 2009 (DE) .......................... 10 2009 033 042

(51) Int. Cl.
*B62D 25/10* (2006.01)

(52) U.S. Cl.
USPC ........................................................ 296/76

(58) Field of Classification Search
USPC ................ 296/76, 106, 146.11, 146.2, 146.5, 296/146.6, 146.9, 178, 187.12, 50, 57.1; 105/378; 49/227, 374, 502, 200, 386; 16/308; 280/808; 160/191, 201; 292/216, 336.3
See application file for complete search history.

(56) References Cited

U.S. PATENT DOCUMENTS

| | | | |
|---|---|---|---|
| 2,272,230 A * | 2/1942 | Van Voorhees | 16/306 |
| 3,476,375 A | 9/1953 | Brasseur | |
| 2,677,146 A | 5/1954 | Vigmostad | |
| 2,688,764 A | 9/1954 | Squire | |
| 2,871,505 A * | 2/1959 | Clark et al. | 16/308 |
| 2,894,277 A * | 7/1959 | Bogater et al. | 16/298 |
| 2,986,770 A * | 6/1961 | Hammond | 16/308 |
| 3,067,453 A * | 12/1962 | Lyons | 16/308 |
| 3,085,286 A * | 4/1963 | Whitehouse et al. | 16/308 |
| 3,339,969 A * | 9/1967 | Bridle et al. | 296/76 |
| 3,635,277 A * | 1/1972 | Bahnsen | 160/191 |
| 4,104,761 A * | 8/1978 | Lyons | 16/84 |

(Continued)

FOREIGN PATENT DOCUMENTS

GB 696420 A1 9/1953

*Primary Examiner* — Kiran B Patel
(74) *Attorney, Agent, or Firm* — Novak Druce Connolly Bove + Quigg LLP (57) ABSTRACT

The invention relates to a motor vehicle having a panel or door, which can be brought from a closed position into an open position against the force of gravity using at least one energy storage element and means coupled therewith for influencing the torsional moment provided on the panel or door by the at least one energy storage element, wherein the panel or door is rotatably supported about an axis of rotation, and wherein the torsional moment can be influenced by the means for influencing depending on the opening position of the panel or door.

5 Claims, 9 Drawing Sheets

(56) References Cited

U.S. PATENT DOCUMENTS

| | | | |
|---|---|---|---|
| 4,291,501 A * | 9/1981 | Steinberg et al. | 49/386 |
| 4,817,927 A * | 4/1989 | Martin | 267/155 |
| 4,863,148 A * | 9/1989 | Hufnagel | 267/278 |
| 4,871,007 A * | 10/1989 | Abolins | 160/201 |
| 4,940,357 A * | 7/1990 | Davis | 403/344 |
| 4,981,165 A * | 1/1991 | Miller et al. | 160/191 |
| 5,235,725 A * | 8/1993 | Rees | 16/298 |
| 5,239,777 A * | 8/1993 | Husselton | 49/200 |
| 5,638,640 A * | 6/1997 | Harbeck et al. | 49/322 |
| 5,664,289 A * | 9/1997 | Wolda et al. | 16/298 |
| 5,730,239 A * | 3/1998 | Holter | 180/69.21 |
| 5,746,468 A * | 5/1998 | Schoen et al. | 296/76 |
| 5,758,389 A * | 6/1998 | Wolda | 16/308 |
| 5,951,088 A * | 9/1999 | Schoen et al. | 296/76 |
| 6,053,235 A * | 4/2000 | Ruffner, Sr. | 160/89 |
| 6,070,929 A * | 6/2000 | Barkley | 296/76 |
| 6,089,304 A * | 7/2000 | Mullet et al. | 160/209 |
| 6,419,293 B1 * | 7/2002 | Nicholas et al. | 296/76 |
| 6,487,754 B1 * | 12/2002 | Keen | 16/306 |
| 6,789,599 B2 * | 9/2004 | Schutz et al. | 160/188 |
| 7,093,877 B2 * | 8/2006 | Duffy | 296/76 |
| 7,234,502 B2 * | 6/2007 | O'Malley | 160/191 |
| 7,350,845 B1 * | 4/2008 | Duffy | 296/76 |
| 7,527,251 B2 * | 5/2009 | Mc Clellan | 267/154 |
| 7,536,748 B2 * | 5/2009 | Renke et al. | 16/289 |
| 7,857,031 B2 * | 12/2010 | Mihalcheon et al. | 160/201 |
| 8,162,026 B1 * | 4/2012 | Lundahl | 160/191 |
| 2003/0038500 A1 * | 2/2003 | Aubry et al. | 296/76 |
| 2003/0041980 A1 * | 3/2003 | Schulte et al. | 160/193 |
| 2003/0178158 A1 * | 9/2003 | Schulte | 160/191 |
| 2004/0262938 A1 * | 12/2004 | Bruford et al. | 296/50 |
| 2004/0262944 A1 * | 12/2004 | Koehler et al. | 296/146.11 |
| 2005/0139331 A1 * | 6/2005 | O'Malley | 160/191 |
| 2011/0308166 A1 * | 12/2011 | Binder et al. | 49/386 |
| 2012/0144646 A1 * | 6/2012 | Bartsch et al. | 29/428 |
| 2012/0168098 A1 * | 7/2012 | James | 160/189 |

* cited by examiner

MOTOR VEHICLE HAVING A MECHANISM FOR MOVING A PANEL OR DOOR

A motor vehicle having a mechanism for moving a panel or door that is designed, in particular, as a rear hatch or scissor style door and can be brought from a closed position into an open position against the force of gravity. Such mechanisms are used in motor vehicles to bring a panel or door from a closed position into an open position and vice versa against the force of gravity with less effort on the part of the user.

BACKGROUND OF THE INVENTION

In principle, it is known that springs, preferably gas pressurized springs, can be used to assist the movement of typically heavy panels or doors in motor vehicles. However, gas pressurized springs have the drawback that the support moment that can be applied varies as a function of the ambient temperature, because the pressure of the working gas in the interior of the gas pressurized spring varies. The result is that such sprung panels or doors are harder to open in the winter and are harder to close in the summer. Furthermore, the torque that has to be applied for the movement of the panel or door varies as a function of the instantaneous pivot position. For example, when the rear hatch leaves its closed position, the torque increases until the rear hatch reaches its horizontal position that is characterized by a maximum torque, whereas when the rear hatch continues to pivot in the direction of the open position, the effective torque decreases. Since as a rule only spring elements exhibiting a linear force/travel characteristic are available, the curved flow of the torque of the panel or door cannot be adequately compensated.

DE 4104125 A1 describes a passenger vehicle having a rear hatch that is hinged to a roof railing by means of two hinges. In this case, each of the two hinges is coupled with a foot of the roof railing and connected to a respective torsion bar spring. The torsion bar spring extends in each case from one foot of the roof railing to the opposite foot. The torsion bar springs help open the rear hatch. In the closed position of the rear hatch, the torsion bar springs are prestressed; and this tension is used, after unlocking, to move the rear hatch into the open position.

DE 3023950 A1 shows a device for adjusting the prestress of torsion bar springs that serve to balance the weight of pivotable body components, like rear hatches, wherein the respective end-sided, moved working section engages with the rear hatch; and an opposite support section is supported on the body side. A ratchet mechanism with a pawl wheel, which can be connected in a torque transmitting manner to one of the bar sections, and with a lock pawl, which can be mounted in a rotationally rigid manner on the body, permits a static adaptation of the torsional moment, which is applied by the torsion bar springs and which counteracts the torque of the rear hatch in the course of opening and closing the same.

With such devices, it is possible to statically vary the torsional moment on a small scale, as a result of which variable assistance in the course of actuating the rear hatch is possible. However, in almost all opening positions of the rear hatch there is a difference between the actual torque of the rear hatch and the adjusted torsional moment of the torsion bar springs, wherein said torsional moment assumes inconveniently high actuating forces over the entire opening path.

Therefore, the object of the present invention is to provide a motor vehicle with a panel or door that keeps the necessary actuating forces for opening or closing the panel or door as low as possible with a relatively compact and robust mechanism.

SUMMARY OF THE INVENTION

The motor vehicle has a panel or door that can be brought from a closed position into an open position against the force of gravity with the use of at least one energy storage element and with means that are coupled to the same for influencing the torsional moment provided on the panel or door by the at least one energy storage element, wherein the panel or door is mounted in a rotatable manner around an axis of rotation, and wherein the torsional moment can be influenced by the means for influencing as a function of the opening position of the panel or door.

These means for influencing that are different from the panel or door are disposed preferably in the force path from the at least one energy storage element to the panel or door or vice versa. The means for influencing the torsional moment make it possible to counteract the circumstance that an energy storage element that is not actuated by these means provides a torsional moment, which decreases linearly in the course of moving the panel or door from the closed position into the open position. In contrast, the torque acting due to the weight of the panel or door usually increases as said panel or door is brought from the closed position into the open position until the panel or door has reached an essentially horizontal position. In this position of the panel or door, the torque acting due to the panel or door has a maximum value. In this respect, the center of mass of the panel or door is at a maximum distance from the pivot axis. In the next phase of pivoting the panel or door, the torque acting due to the panel or door decreases again until the end position, is reached. Owing to the means for influencing the torsional moment, it is possible to influence, preferably reduce, in an advantageous way the difference between the torsional moment transmitted from the at least one energy storage element to the panel or door, and the counter-moment, acting due to the weight of the panel or door.

In one preferred embodiment, the means for influencing influence the torsional moment in such a way that the result is a moment equilibrium in several opening positions, preferably in each opening position of the panel or door. With this strategy it is possible to achieve that even the maximum value of the torque applied by the panel or door is compensated by the at least one energy storage element. At the same time, it can be achieved that when the opening positions deviate from the opening position of the panel or door characterizing the maximum value, a smaller moment is transmitted from the energy storage element to the panel or door, so that an overly fast opening of the panel or door is counteracted.

In this way, the actuating forces for pivoting the panel or door can be kept especially low, so that additionally a self-holding of the panel or door in several opening positions or more specifically in each opening position is guaranteed. In another advantageous way, the means for influencing are in two different states when the panel or door is in two opening positions that are different from each other. In this way, it can be provided that when the panel or door is in the opening position, in which the torque of the panel or door has a maximum value, the means for influencing do not provide a torsional moment, so that the panel or door is held in a floating state by the torsional moment of the energy storage element. On the other hand, in a second opening position that deviates from this first opening position, the means for influencing are located in a second state, in which the torsional moment, which is transmitted from the at least one energy storage element to the panel or door, is reduced in such a way that the torque of the panel or door is compensated at least to a very large extent. If the panel or door is held in the floating state even over its entire pivot path, then only a very small force, which overcomes the effect of an inert mass of the panel or door, such as frictional forces, has to be provided for opening or closing the panel or door. This very small force can be applied by the manual force of an operating person or by a drive motor having a very low power output. As an alternative, a torsional moment, which is slightly greater, especially uniformly over the entire pivot path, than the counter-moment of the panel or door, can be transmitted to the panel or door by means of the at least one energy storage element. This approach enables, for example, an especially convenient, automatic opening of the panel, or door, for instance, after unlocking the panel or door by means of a remote keyless entry system. For this purpose, only a comparatively small manual force or force of the drive motor has to be applied for closing the panel or door.

In one preferred embodiment, the energy storage elements exhibit an essentially linear force/travel characteristic. Energy storage elements having a linear force/travel characteristic, that is, for example, spring elements exhibiting a linear spring characteristic according to Hooke's law, exist in a number of embodiments, so that a specific selection for the current application can be made.

In one preferred embodiment, the energy storage elements are constructed as torsion bar springs or torsion bar spring systems, the torsion bar spring systems in an especially preferred embodiment consisting of several torsion bars that are connected to each other in such a manner that the effective length of the torsion bar springs that are connected to each other is increased. The preferred torsion bar, springs or torsion bar spring systems are especially cost-effective as well as robust and permit a compact configuration of the energy storage elements, as a result of which these energy storage elements are easier to integrate into the body of the motor vehicle. Since several torsion bars are arranged, for example, in parallel and are connected to each other in a meander shape and in a rotationally rigid manner, the resulting torsion bar spring system has an especially large effective length with simultaneously a low design space requirement. Instead of a single torsion bar spring exhibiting a comparatively large cross-sectional area, it is possible to couple a torsion bar spring system, comprising two torsion bar springs that are coupled to each other with a hinge of the panel or door, so that the two torsion bar springs that are coupled to each other can exhibit in each case a smaller cross-sectional area. The coupling of two or more torsion bar springs can be performed, for example, by means of a serration of the torsion bar springs having a round cross section or by means of a different suitable connection between the torsion bar springs that are configured, for example, as flat bars.

It has also been proven to be advantageous if a coupling element, which can vary the effective length of the torsion bar springs that are coupled to each other, is provided for the purpose of coupling two torsion bar springs that are operationally connected to each other. By changing the effective length of the torsion bar springs that are coupled together, it is possible to change a torsional moment provided by the torsion bar springs on the panel or door. In the event of an additional load on the panel or door, for example, snow that is lying on the panel or door, the effective length of the torsion bar springs that are coupled to each other can be increased in order to help adapt the opening of the panel or door to the modified boundary conditions.

In one preferred embodiment, the torsion bar spring or the torsion bar spring system is integrated into a body element that is provided for defining a passenger compartment. In this case, the integration can be an arranging of two body components, which provide a double-walled body element, or an arranging of a trim part and a body component. The invention makes it possible to house the mechanism in a location where it requires little space and is especially unobtrusive. In a passenger vehicle, the passenger compartment is defined in the rear direction by a hatch, which can be constructed as a fastback, hatchback, or notchback.

In one preferred embodiment, a lever having a variable lever arm length is mounted in a rotationally rigid manner on the energy storage element. The freely pivotable end of said lever is guided in a groove. In addition, a thrust element engages with the freely pivotable end. Said thrust element is operationally connected to the panel or door and can be moved in an essentially translatory manner by said panel or door. Since the lever, which couples the energy storage element, with the thrust element, can vary its lever arm length, it is possible to adapt the force characteristic, or more specifically the torque characteristic of the linear energy storage element, to the curved torque characteristic of the panel or door. Hence, in any position of the panel or door, irrespective of whether it is pivoted from the closed position into the open position or vice versa from the open position into the closed position, the torque of the panel or door is resisted by a commensurate torsional moment of the energy storage element. This strategy permits very low actuating forces and, for example, a self-holding of the panel or door in each position. By varying the prestress of the energy storage element, for example, by means of an electromechanical actuator, it is possible to adjust the flow of the torsional moment in parallel to the torque of the panel or door so that the panel or door either closes or opens by itself.

In one preferred embodiment, the groove is configured as a first oblong hole, in which a bolt, which is disposed on the freely-pivotable end of the lever, is guided. Owing to the arrangement of the bolt in the groove, which is configured as a first oblong hole, the freely pivotable end of the lever can move with very low frictional forces.

In one preferred embodiment, the bolt is positioned in a moveable manner in a second oblong hole, which is configured in the lever and which extends essentially in the axial direction of the lever. This design makes it possible to displace the bolt in the second oblong hole along the axial reach of the lever, so that the lever arm length can be varied by means of a suitable configuration of the move as a function of the degree to which the panel or door is open. The moveable positioning of the bolt further reduces the frictional forces, because the bolt can roll in the groove.

In one preferred embodiment, the first oblong hole is configured in a curvilinear, preferably sinusoidal, shape in the axial reach. Since the first oblong hole is configured in a curvilinear, preferably sinusoidal, shape in the axial reach, the lever arm length of the lever can be adapted by the guidance of the bolt in the first oblong hole and by the axial displaceability of the bolt in the second oblong hole in such a way that the result is a desired torsional moment characteristic that counteracts the specific torque characteristic of the panel or door in the course of pivoting the same. Furthermore, depending on the torque characteristic of the panel or door, circularly shaped or freely shaped oblong hole contours are also possible.

In one preferred embodiment, the thrust element exhibiting an offset from the axis of rotation engages with the panel or door. As a result, the rotational movement of the panel or door, which can be pivoted around the axis of rotation, is transformed in an especially simple way into a translatory movement of the thrust element.

In one preferred embodiment, a first and a second energy storage element can be loaded with forces in the opposite direction of action; and, the energy storage elements are operationally connected to the panel or door via the means for influencing, with the means for influencing being constructed as coupling elements that engage with the panel or door with an offset from the axis of rotation. Since a first and a second energy storage element can be subjected to a force in the opposite direction of action, a variable, preferably asynchronous, loading of the energy storage elements can be performed, as a function of the instantaneous position of the panel or door, by attaching the coupling elements with an offset from the axis of rotation to the panel or door. Owing to the reciprocal influencing of the two energy storage elements, the torque of the panel or door is resisted by a specific torsional moment from the energy storage elements. The connection of the energy storage elements with, the panel or door by means of the coupling elements is characterized, in particular, by its robust design, because only a few moveable parts have to be mounted.

In one preferred embodiment, the coupling elements are constructed as articulated hinges and are mounted in a rotationally rigid manner on the energy storage elements.

In one preferred embodiment, the means for influencing comprise a transmission element, in particular, an eccentric cam, which is connected in a rotationally rigid manner to the at least one torsion bar spring. In this case, there is a thrust element, which is coupled with the panel or door, so that the eccentric cam is moved by the thrust element when the panel or door is moved. If an eccentric cam is provided, then said eccentric cam is connected to the torsion bar spring in such a way that its point of rotation coincides with an axis of rotation of at least one torsion bar spring. By moving the transmission element, in particular, the eccentric cam, which is coupled to the movement of the panel or door, the torsional moment, transmitted from the at least one torsion bar spring to the panel or panel, can be adapted with a very high degree of accuracy to the torque applied by the panel or door when said panel or door is moved. The transmission element can comprise a pivot arm, which is hinged to at least one torsion bar spring and which is pivoted by means of a body, which executes a rotational movement owing to the movement of the panel or door and which is connected in a rotationally rigid manner to the panel or door.

Pivoting the at least one pivot arm effects a change in the prestress of the at least one torsion bar spring. Since this rotational movement of the body, which is constructed, for example, as a cam plate, is transformed into a rotational movement of the at least one torsion bar spring around its longitudinal axis, the friction losses in the course of changing the prestress are especially low.

In one preferred embodiment, the means for influencing have a cam plate, which is connected in a rotationally rigid manner to the panel or door, and a transmission element, which is connected to the thrust element and which is moved by the cam plate when the panel or door is brought into the open position. In this way, a translatory movement of the thrust element is transformed into a rotational movement of the eccentric cam by means of a mechanical coupling that is easy to achieve. In an advantageous embodiment, the means for influencing have a cam plate, which is connected in a rotationally rigid manner to the panel or door, and a transmission element, which is connected to the thrust element, so that the transmission element is moved by the cam plate when the panel or door is brought into the open position. In so doing, the transmission element can roll on an outer edge of the cam plate or can slide along the outer edge of the cam plate. In this way, the movement of the panel or door into the open position effects, owing to the mechanical coupling with the at least one torsion bar spring, an automatically controlled, especially fail-safe and exact adaptation of the moment, which is transmitted from the torsion bar spring to the panel or door, to the moment applied by the panel or door.

In one preferred embodiment, a distance from an outer edge of the cam plate to its center point is variable. In particular, a sinusoidal profile of the outer edge of the cam plate has proven to be especially effective in order to compensate for the torque, applied by the panel or the door, in an especially comprehensive and, uniform manner over the entire opening path of the panel or door, by influencing the torsional element provided by the torsion bar spring.

In one preferred embodiment, at least one torsion bar spring can move a pivot arm, which is in sliding contact with the panel or door when said panel or door is moved. In this case, the sliding contact can be provided by a roller, a ball, a sliding block, or the like. This strategy achieves the engineering objective of an especially low-loss transmission of the moment, provided by the torsion bar spring, to the panel or door. Furthermore, the at least one torsion bar spring can be configured so as to extend in a sloped or curved manner in relation to a transverse vehicle axis that is defined relative to the motor vehicle; and yet the moment, provided by the at least one torsion bar spring on the panel or door, can be transmitted in parallel to the transverse axis of the vehicle and thus can be transmitted to the panel or door in the pivot direction of the said panel or door.

In one preferred embodiment, the at least one torsion bar spring is shorter than a width of the panel in the direction of the transverse vehicle axis defined relative to the motor vehicle. Hence, a length of a single torsion bar spring or a respective length of a plurality of torsion bar springs that are coupled to each other can be dimensioned in such a way that said length reaches from a hinge, disposed on the edge of the panel, as far as a center (seen in the direction of the transverse axis of the vehicle) of the motor vehicle. This feature is advantageous especially when the at least one torsion bar spring is disposed inside the roof cross member or rather the roof for moving the rear hatch, because the at least one torsion bar spring can be arranged in an especially easy way inside the roof cross member or more specifically the roof which typically exhibits a curvature.

In one preferred embodiment, the at least one torsion bar spring is curved and supported on at least one support bearing. In this way, the torsion bar spring, which is disposed inside the roof cross member or rather the roof, can extend from one side, of the motor vehicle in the direction of the transverse axis of the vehicle as far as the other side of the motor vehicle and, in so doing, can conform with the curvature of the cross member or the roof and can be supported, for example, in a centered manner on the support bearing. As a result, even comparatively long torsion bar springs can be easily integrated into the desired car body element.

In one preferred embodiment, the at least one torsion bar spring is surrounded by at least a housing for enhancing the transverse stiffness of the car body element. At the same time, the at least one housing contributes in an advantageous way to the overall transverse stiffness of the car body element, for example, the cross member. The housing can be constructed of two half shells, which hold, the at least one torsion bar spring that is surrounded, in particular, by a bearing sleeve. In addition, the housing can be reinforced by a support element, for example, a sheet metal support plate that exhibits reinforcing elements, in particular, beads or the like.

In one preferred embodiment, the panel is a rear hatch or a trunk lid, wherein the means for influencing, engage in a symmetrical manner with the outer edge regions of the rear hatch or the trunk lid. The symmetrical engagement of the means for influencing with the at least one outer edge region of the panel makes it possible to give the rear hatch maximum assistance when the mechanism is mounted unobtrusively, because the torque of the panel or door is split between two symmetrical mechanisms comprising the assigned energy storage elements. The invention also makes possible, among other things, the use of such a panel that has a length of at least 1.15 in, preferably at least 1.20 m, even more preferred at least 1.25 m, and most highly preferred at least 1.30 m, perpendicularly to the transverse axis of the vehicle (typically perpendicularly to the pivot axis). This feature opens up new possibilities for vehicle designers. They can give the motor vehicle a different look based on aesthetic or also aerodynamic reasons.

If the panel is a rear hatch, then it is especially advantageous to integrate the at least one torsion bar spring into the roof cross member. At the same time, the roof cross member can form in certain regions a roof of the passenger compartment. Hence, the at least one torsion bar spring is housed in an especially unobtrusive way and with such an orientation and at such a place, from where optimal forces can be transmitted to the rear hatch. If, in contrast, the panel is a trunk lid, then a cross member, which is arranged below a rear window, can serve to house in an unobtrusive way the at least one torsion bar spring.

In one preferred embodiment, the door is a scissor door or butterfly door. Scissor doors are doors that are affixed to a car body pillar post of the motor vehicle and open an access opening to the motor vehicle for the passenger by means of an essentially vertical pivot movement. Butterfly doors perform, in addition to the vertical pivot movement, a laterally oriented, movement and optionally also open a part of the roof of the motor vehicle, a feature that affords the passengers advantages on entering the motor vehicle.

The at least one torsion bar spring that is described in the present invention makes it possible to compensate for the torques acting in the course of bringing the panel or door from the closed position into the open position due to the particular length and weight of the panel or door, so that only very small moments have to be provided over the entire opening path of the panel or door in order to open the panel or door; and these small moments are especially easy to apply by means of the manual force of an operating person. In order to provide these very small moments, it is also possible to provide a very weak motor, for example, a piezo motor. In the event that an object or a human body part is caught between the panel or more specifically the door and an adjacent car body component, such a very weak motor makes it easily possible to quickly reduce the drive power output of the motor as soon as an external force is recognized due to something having been caught.

Other details, features, and advantages of the invention will become apparent from the following description of one preferred embodiment of the invention.

DETAILED DESCRIPTION OF THE PREFERRED EMBODIMENTS OF THE INVENTION

Figure 1:
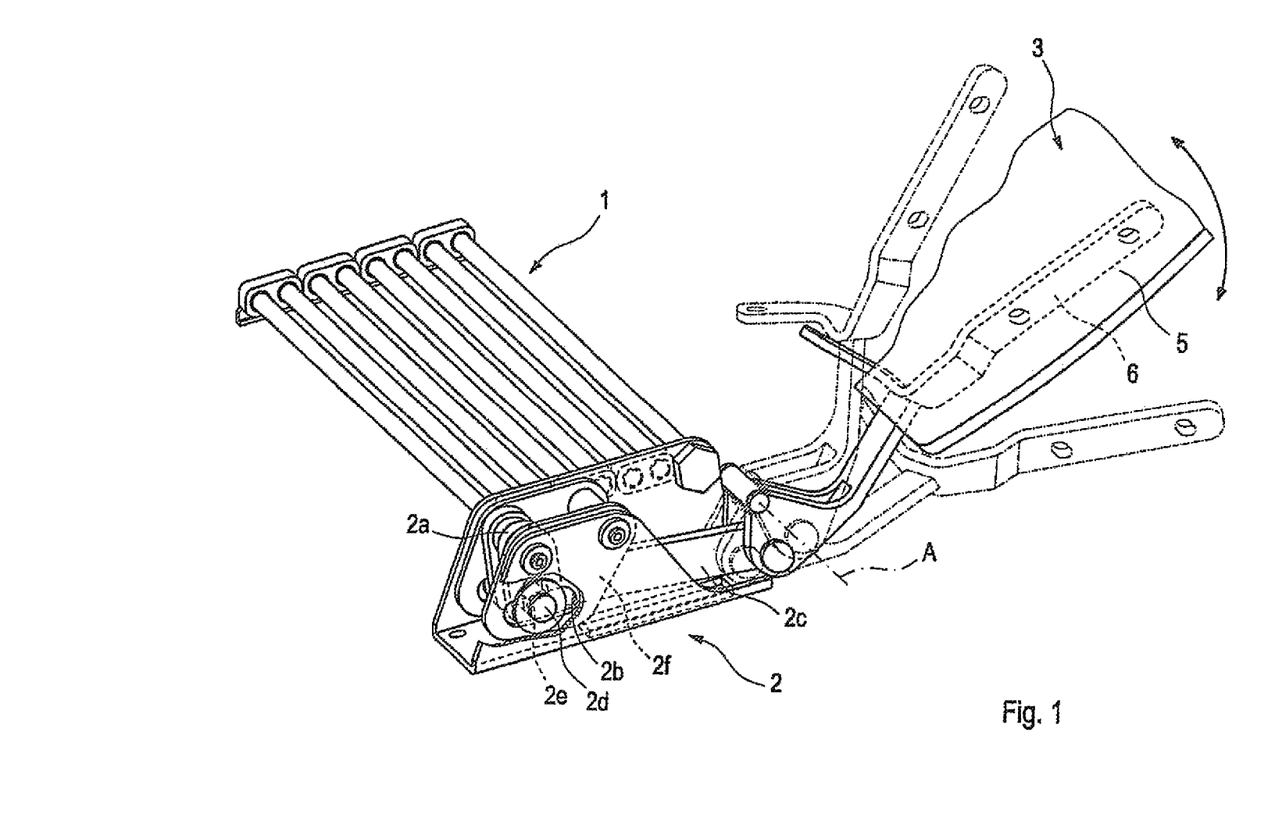
FIG. 1 shows a first embodiment of a torsion bar spring system for a motor vehicle according to the invention.

According to FIG. 1, a panel 3 or door 3 can be brought from a closed position into an open position against the force of gravity, wherein said panel 3 or door 3 has a hinge lever 6 that is arranged in an edge region 5 of the panel 3 or door 3. Said lever is mounted in a rotatable manner around an axis of rotation A, thus permitting a pivot movement of the panel 3 or door 3 from the closed position into the open position and vice versa. At the same time, FIG. 1 shows by way of example three different pivot positions of the hinge lever 6. A thrust element 2c with an offset from the axis of rotation A is mounted on the hinge lever 6, so that the pivot movement of the panel 3 or door 3 can be transformed into a translatory movement of the thrust element 2c. Furthermore, there is an energy storage element in the form of a torsion bar spring system 1, of which the one end is firmly secured and the other end is connected in a rotationally rigid manner to a lever 2a. The torsion bar spring system 1 consists of several parallel torsion bars having ends that are connected to each other in such a manner that the effective length of the single torsion bars is elongated in such a way that a desired spring characteristic can be achieved. The freely pivotable end of the lever 2a has a second oblong hole 2e, which extends in the axial direction of the lever 2a and positions a bolt 2d in an axially displaceable manner. Furthermore, the bolt 2d is guided in a groove that is configured as a first oblong hole 2b, wherein the first oblong hole 2b is made in a carrier plate 2f that is mounted stationarily. The first oblong hole 2b is dimensioned in such a way that the bolt 2d can be moved primarily only in the axial reach of the first oblong hole 2b. The thrust element 2c engages with the bolt 2d and transmits in this way the movement of the panel 3 or door 3 to the lever 2a that in turn twists in a suitable manner around the torsion bar spring system 1. Ipso doing, the first oblong hole 2b has a curvilinear, in particular sinusoidal, profile in the axial reach, so that on passing through the first oblong hole 2b, the effective length of the lever 2a is continuously adapted in connection with a movement of the bolt 2d in the second oblong hole 2e in such a way that a torque that is introduced by the panel 3 or door 3 is resisted by a counter-directed torsional moment from the torsion bar spring system 1 that keeps in balance the panel 3 or door 3 in any position. If the panel 3 or door 3 is a rear hatch, then the corresponding torsion bar spring systems 1 and means for influencing 2 are arranged in a preferably symmetrical manner on the motor vehicle in order to act on the respective outer edge region 5 of the panel 3 or door 3.

Figure 2:
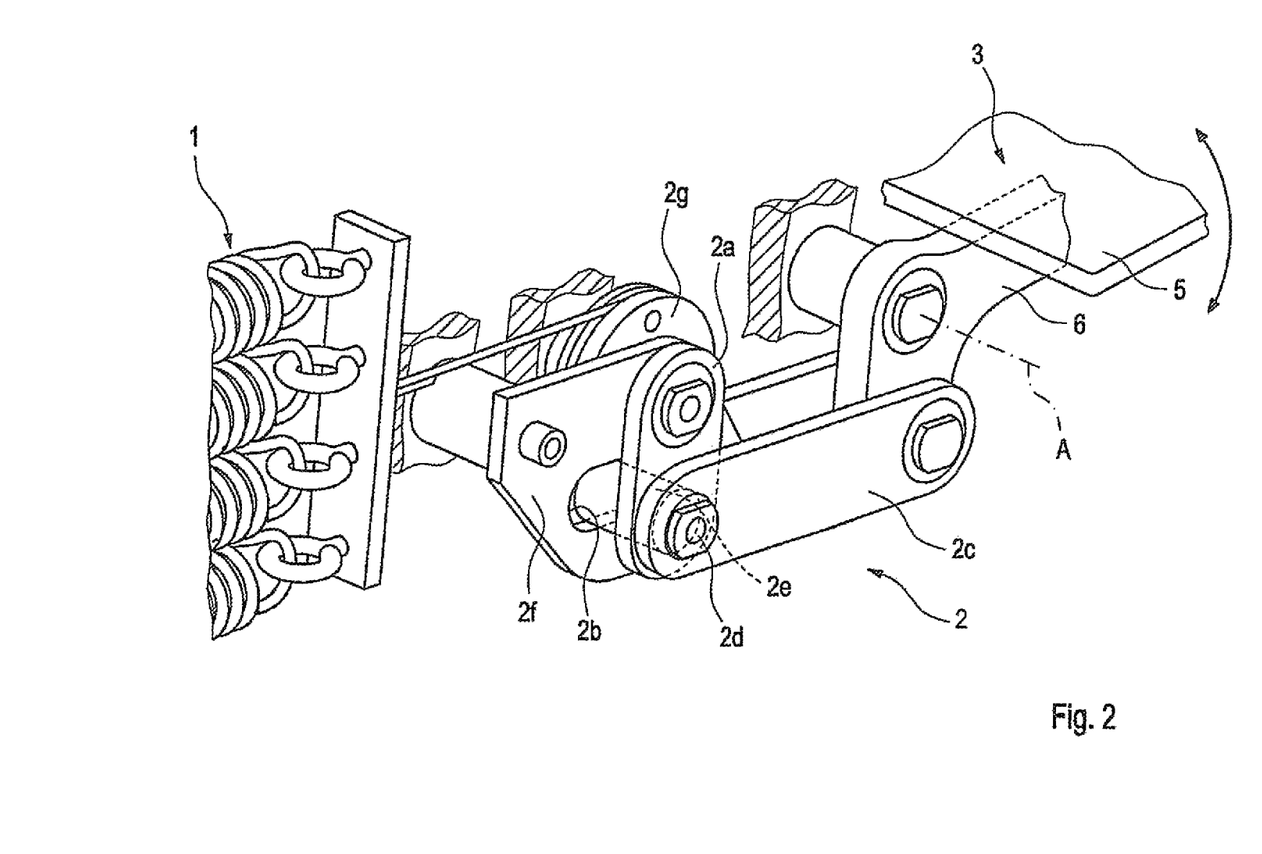
FIG. 2 shows a first embodiment comprising an alternative energy storage element.

According to FIG. 2, a panel 3 or door 3 can be brought from a closed position into an open position against the force of gravity, wherein said panel 3 or door 3 has a hinge lever 6 that is arranged in an edge region 5 of the panel 3 or door 3. Said lever is mounted in a rotatable manner around an axis of rotation A, thus permitting a pivot movement of the panel 3 or door 3 from the closed position into the open position and vice versa. A thrust element 2c with an offset from the axis of rotation A is mounted on the hinge lever 6, so that the pivot movement of the panel 3 or door 3 can be transformed into a translatory movement of the thrust element 2c. Furthermore, there is an energy storage element 1 in the form of a spiral spring system, of which the one end is firmly secured and the other end is connected to the lever 2a by means of a tensioning cable guided over a cable pulley 2g. In this case, the cable pulley 2g can be constructed as a part of the lever 2a and serves to translate the rotational movement of the lever 2a into a translatory movement of the tensioning cable. The spiral spring system 1 preferably consists of several parallel spiral springs, which are connected to the tensioning cable by way of a common holding plate, so that a desired spring characteristic can be achieved with a minimum design space requirement. In the meantime, the freely pivotable end of the lever 2a has a second oblong hole 2e, which extends in the axial direction of the lever 2a and positions a bolt 2d in an axially displaceable manner. Furthermore, the bolt 2d is guided in a groove that is configured as a first oblong hole b, wherein the first oblong hole 2b is made in a carrier plate 2f that is mounted stationarily. In this case, the first oblong hole 2b is dimensioned in such a way that the bolt 2d can be moved primarily only in the axial reach of the first oblong hole 2b. The thrust element 2c engages with the bolt 2d and transmits in this way the movement of the panel 3 or door 3 to the lever 2a that in turn twists in a suitable manner the spiral spring system 1. In so doing, the first oblong hole 2b has a curvilinear, in particular sinusoidal, profile in the axial reach, so that on passing through the first oblong hole 2b, the effective length of the lever 2a is continuously adapted in connection with a movement of the bolt 2d in the second oblong hole 2e in such a way that a torque that is introduced by the panel 3 or door 3 is resisted by a counter-directed torsional moment from the spiral spring system 1 in interaction with the cable pulley 2g. This spiral spring system keeps in balance the panel 3 or door 3 in any position. If the panel 3 or door 3 is a rear hatch, then the corresponding spiral spring systems 1 and means for influencing 2 are arranged in a preferably symmetrical manner on the motor vehicle in order to act on the respective outer edge region 5 of the panel 3 or door 3.

Figure 3:
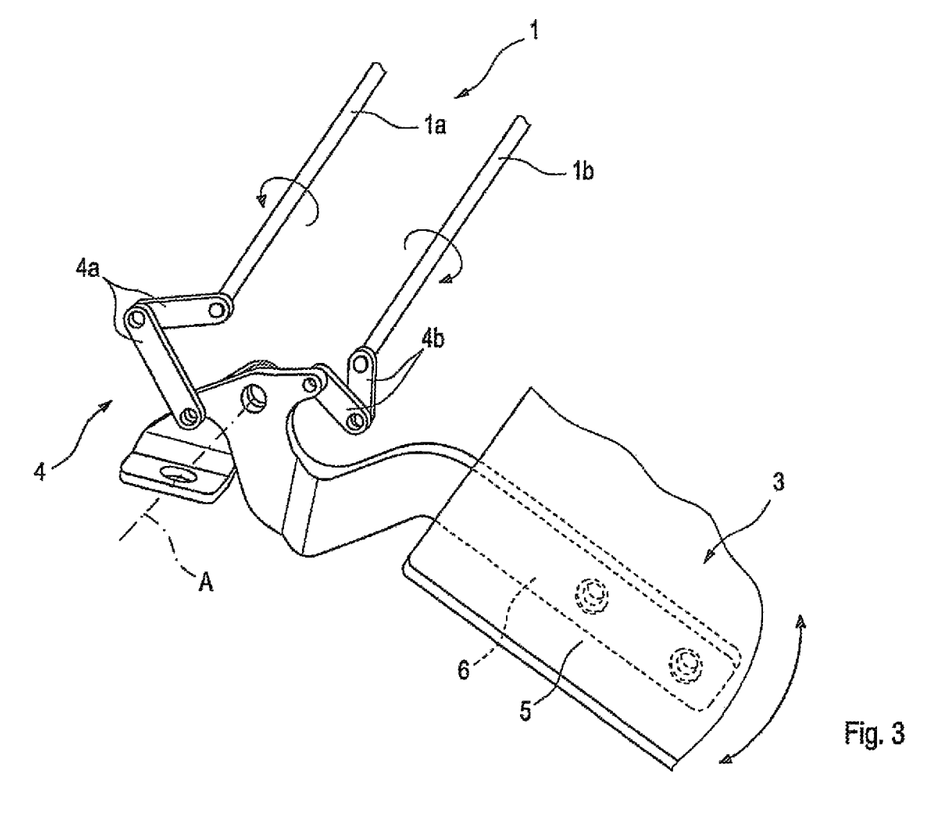
FIG. 3 shows a second embodiment of a torsion bar spring system for a motor vehicle according to the invention.

According to FIG. 3, a panel 3 or door 3 can be brought from a closed position into an open position against the force of gravity, wherein said panel 3 or door 3 has a hinge lever 6 that is arranged in an edge region 5 of the panel 3 or door 3. Said lever is mounted in a bearing block so as to be rotatable around an axis of rotation A, thus permitting a pivot movement of the panel 3 or door 3 from the closed position into the open position and vice versa. There are opposing coupling elements 4a and 4b, which exhibit an offset from the axis of rotation A and are constructed preferably as two-membered articulated hinges. The coupling elements 4a and 4b engage with an energy storage element 1a and 1b, which is constructed preferably as a torsion bar spring or a torsion bar spring system. Since the coupling elements 4a and 4b engage with the hinge lever 6 so as to be offset relative to the axis of rotation A, a movement of the panel 3 or door 3 results in a change in the effective normal distance between the point of engagement of the coupling elements 4a and 4b on the hinge lever 6 and the corresponding first 1a or second torsion bar spring 1b, both of which are consequently loaded with a varying amount of force in the opposite direction of action and are twisted. As a result, the torque introduced by the panel 3 or door 3 in any position of the panel 3 or door 3 is resisted by the torsional moment, which is applied by the first 1a and the second 1b torsion bar spring and which keeps in balance the panel 3 or door 3. If the panel 3 or door 3 is a rear hatch, then the corresponding, torsion bar spring systems 1 and means for influencing 4 are arranged in a preferably symmetrical manner on the motor vehicle in order to act on the respective outer edge region 5 of the panel 3 or door 3.

Figure 4:
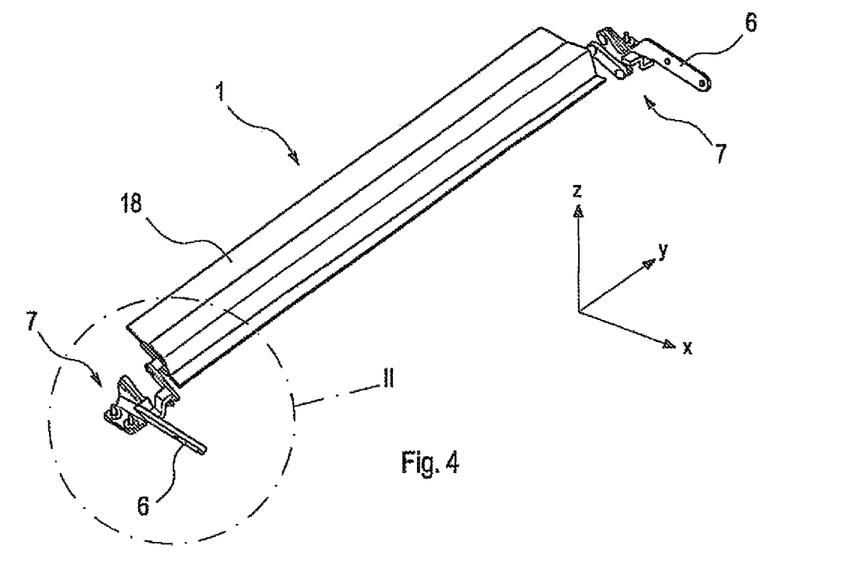
FIG. 4 shows a torsion bar spring system to help open a rear hatch of an inventive motor vehicle comprising a third embodiment of the torsion bar spring system.

According to FIG. 4, an energy storage element, which is constructed as a torsion bar spring system 1, helps to open a rear hatch of a motor vehicle. The torsion bar spring system 1 acts on the rear hatch (not illustrated in FIG. 4), which can be pivoted around an axis of rotation A (shown in FIG. 5), by means of a right and a left hinge lever 6. The torsion bar spring system 1 has a longitudinal reach, which runs parallel to a transverse axis y of the vehicle and perpendicular to a longitudinal axis x of the vehicle. Similarly, the axis of rotation A runs parallel to the transverse axis y of the vehicle.

Figure 5:
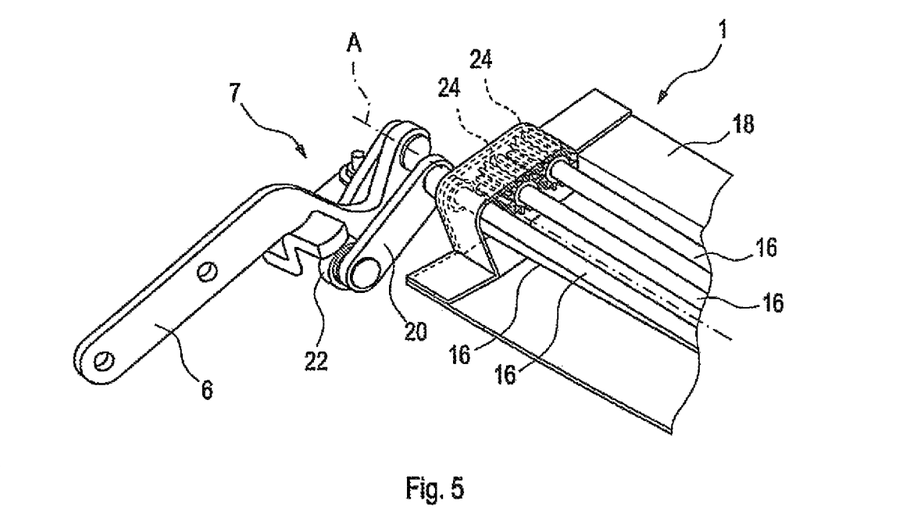
FIG. 5 is a partially cut, enlarged detail view of the torsion bar spring system according to FIG. 4.

FIG. 5 shows that the torsion bar spring system 1 comprises four single torsion bar springs 16, which are surrounded by a housing 18. In each case, two of the four torsion bar springs 16 serve to move a pivot arm 20, which acts on the hinge lever 6 by way of a roller 22. When the rear hatch is unlocked, the prestressed torsion bar springs 16 effect a pivoting action of the pivot arm 20, as a result of which the roller 22 rolls on an abutment of the hinge lever 6. The two torsion bar springs 16 acting on the hinge lever 6 are coupled to each other by means of a serration in the edge region of the housing 18. The edge region of the housing 18 is arranged adjacent to the opposite hinge lever 6 (not depicted in FIG. 5). Thus, the effective length of the torsion bar springs 16, which transmit a torsional moment to the pivot arm 20, is twice the length of a single torsion bar spring 16. The two additional torsion bar springs 16, which subject the hinge lever 6 to a torsional moment when the rear hatch is moved, are also intermeshed by means of gearwheels 24 in the edge region of the housing 18. The gearwheels (not shown in the present case), which couple together the torsion bar springs 16, assigned to the opposing hinge lever 6, are provided in an analogous way in the torsion bar spring system 1.

Figure 6:
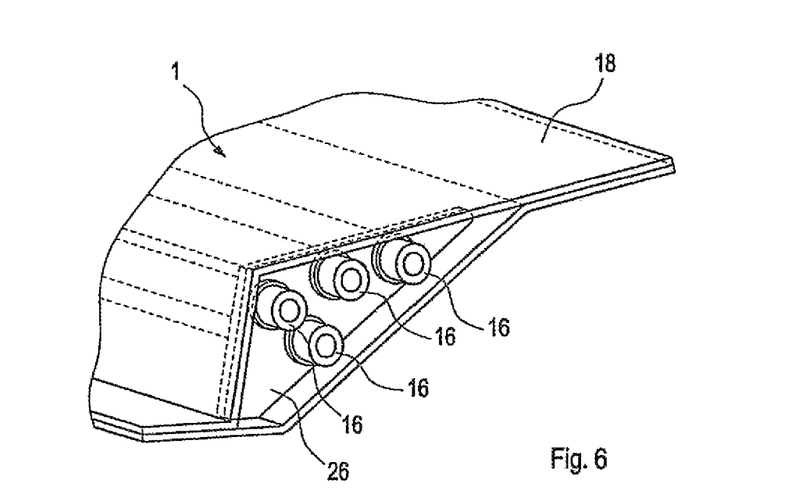
FIG. 6 is a perspective view of a central section of the torsion bar spring system according to FIG. 4.
Figure 7:
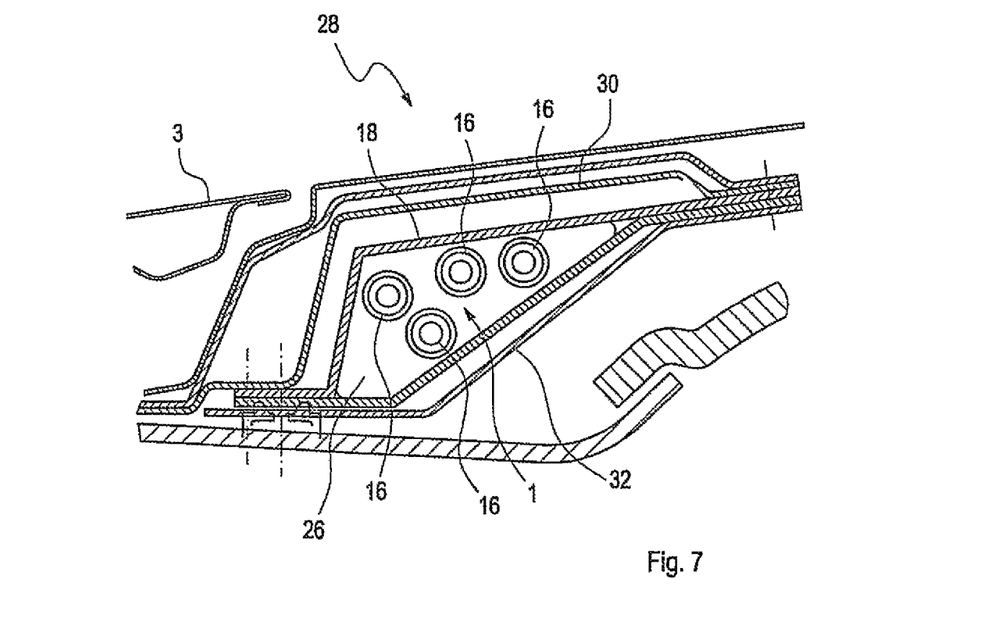
FIG. 7 shows a central section of the torsion bar spring system, which is integrated into a roof cross member of the motor vehicle, according to FIG. 4.

FIG. 6 and FIG. 7 show that the four torsion bar springs 16 are supported on a support bearing 26 in the center of the motor vehicle in relation to the transverse axis y of the vehicle. In this case, the support bearing 26 has four passage boreholes, through which the torsion bar springs 16 pass. Thus, in the region of the support bearing 26, three of the four torsion bar springs 16 are arranged essentially in one plane; one of the four torsion bar springs 16 is located below this plane. The torsion bar spring system 1 is integrated into a roof cross member 28 of the motor vehicle. The roof cross member 28 comprises an upper part 30 and a bottom part 32 that is connected to said upper part. In this case, the mounting flanges of the housing 18 are connected to the upper part 30 and to the bottom part 32. FIG. 7 shows the rear hatch 3 attached rearwards to the roof cross member 28 in the direction of the longitudinal axis x of the vehicle.

Figure 8:
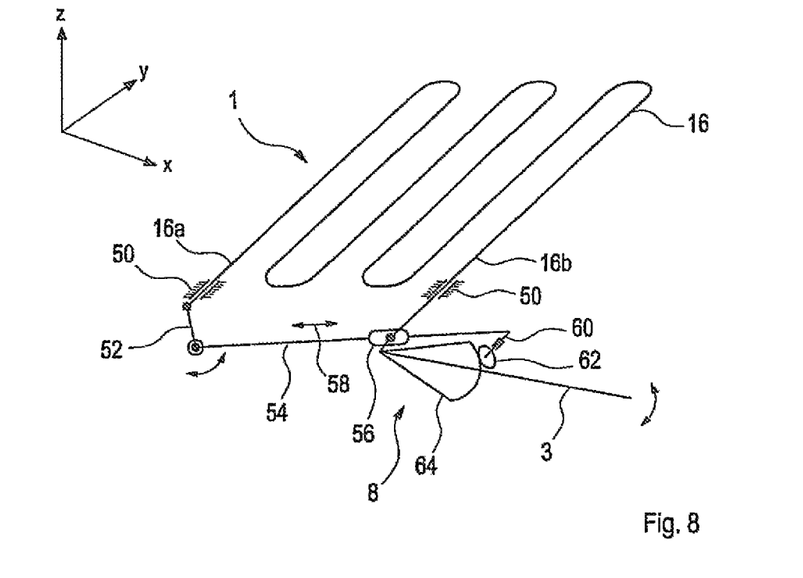
FIG. 8 shows a fourth, highly schematized embodiment of a torsion bar spring system to help open a rear hatch of a motor vehicle according to the invention.

FIG. 8 is a highly schematized view of an alternative torsion bar spring system 1, which has a torsion bar spring 16, which is bent in the shape of a meander and of which its six parallel sections are connected together by means of five curved regions. A frontal section 16a and a rear section 16b, which runs parallel to this frontal section, of the torsion bar spring 16 are mounted stationarily, but rotationally moveable, in a respective fixed, bearing 50. The torsion bar spring 16 is prestressed, so that a torsional moment on the rear hatch 3 is provided by way of the rear section 16b. In the present case, the means for influencing 8 the torsional moment provided by the torsion bar spring 16 on the rear hatch 3 comprise an eccentric cam 52, which is connected in a rotationally rigid manner to the frontal section 16a and which is mechanically coupled to the rear hatch 3 by means of a thrust element 54. The thrust element 54 has an oblong hole 56, through which the rear section 16b of the torsion bar spring 16 passes. The thrust element 54 is moveable in the direction of the longitudinal axis x of the vehicle relative to the rear section 16b of the torsion bar spring 16 that is fixed in the fixed bearing 50. A corresponding direction of movement of the thrust bearing 54 is illustrated by a movement arrow 58 in FIG. 8. A transmission element 60 is connected to the thrust element 54. When the rear hatch 3 is brought, from the closed position into the open position and back, the said transmission element is moved. To this end, the transmission element 60 has a roller 62, which rolls on a cam plate 64, which is connected in a rotationally rigid manner to the rear hatch 3, when the rear hatch 3 is pivoted.

Figure 9:
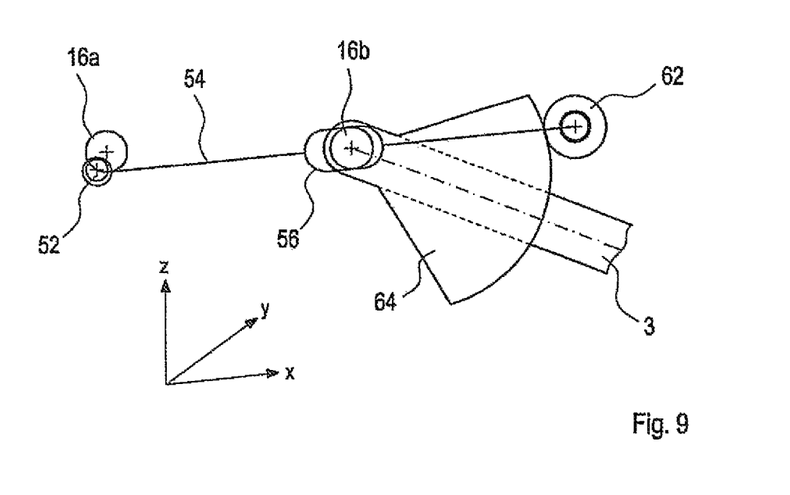
FIG. 9 is a side view of the torsion bar spring system according, to FIG. 8 with the rear hatch in the closed position.

FIG. 9 shows the torsion bar spring system 1 according to FIG. 8, wherein the rear hatch 3 is located in the closed position. In this case, the oblong hole 56 in relation to a central axis of the rear section 16b is displaced in the direction of the frontal section 16a comparatively far along the longitudinal axis x of the vehicle. Accordingly, the eccentric cam 52 is moved in relation to a central axis of the frontal section 16a so far in the direction of the frontal section 16a that the prestress of the torsion bar spring 16 is reduced due to the eccentric cam 52. Thus, when the rear hatch 3 is in the closed position, the eccentric cam 52 provides a counter-moment to the moment transmitted from the torsion bar spring 16 to the rear hatch 3.

Figure 10:
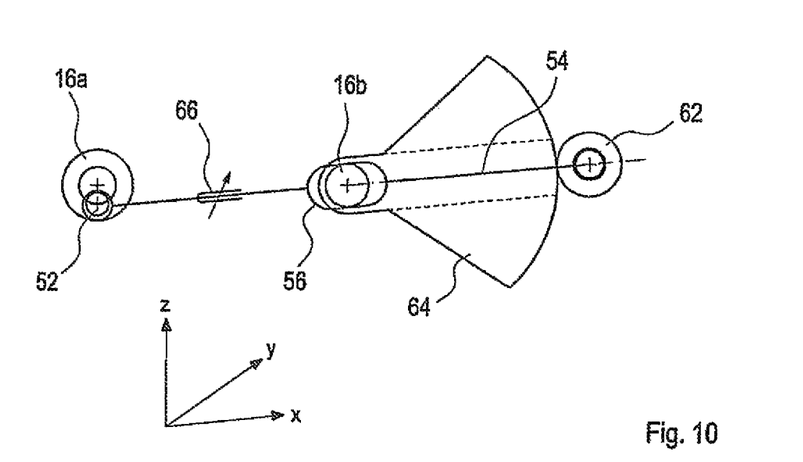
FIG. 10 is a side view of the torsion bar spring system according to FIG. 8 with the rear hatch in a first open position.

FIG. 10 shows the rear hatch 3, which can be opened by an opening angle of 52 degrees, at an opening angle of 26 degrees. At this opening angle, the moment applied by the rear hatch 3 is maximal, because the force of gravity has a maximum effect on the center of mass of the rear hatch 3. The roller 62, which is unchanged relative to the position of the roller 62 (shown in FIG. 9) in the direction of the vertical axis z of the vehicle, is moved the maximum amount away from the rear section 16b in the direction of the longitudinal axis x of the vehicle by means of the cam plate 64. Accordingly, the oblong hole 56 and with it the thrust element 54 are displaced toward the front especially far, in the direction of the longitudinal axis x of the vehicle in relation to the rear section 16b of the torsion bar spring 16. In this position of the rear hatch, the eccentric cam 52 does not provide a counter-moment to the moment transmitted from the torsion bar spring 16 to the rear hatch 3. Furthermore, FIG. 10 shows that the thrust element 54 has an adjusting device 66, by means of which a length of the thrust element 54 is variable. This feature makes it possible to achieve the engineering objective that the prestress of the torsion bar spring 16 is adapted to a specific rear hatch 3.

Figure 11:
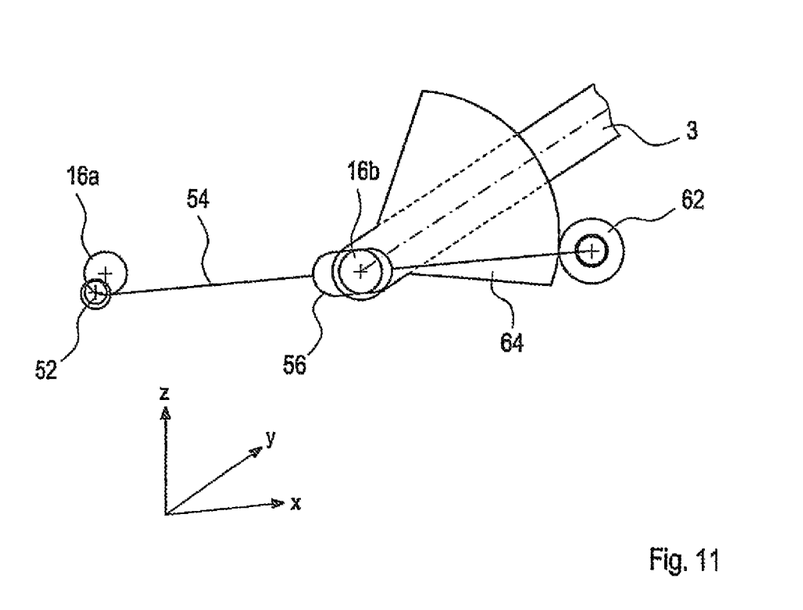
FIG. 11 is a side view of the torsion bar spring, system according to FIG. 8 with the rear hatch in a second open position.

FIG. 11 shows the rear hatch 3 in the open position, during which the rear hatch 3 is pivoted by 52 degrees in relation to the position shown in FIG. 9. In a manner analogous to the operating principle of the means for influencing 8 the torsional moment provided by the torsion bar spring 16 described in FIG. 9, the roller 62 is rolled on the cam plate 64, because the cam plate 64 is pivoted upward in the direction of the vertical axis z of the vehicle. In contrast, the roller 62 is in an unchanged position in the direction of the vertical axis z of the vehicle. In this position of the rear hatch 3, the eccentric cam 52 reduces the torsional moment provided by the torsion bar spring 16. An outer edge of the cam plate 64, which is symmetrical in relation to the rear hatch 3, forms a sinusoidal contour line.

Figure 12:
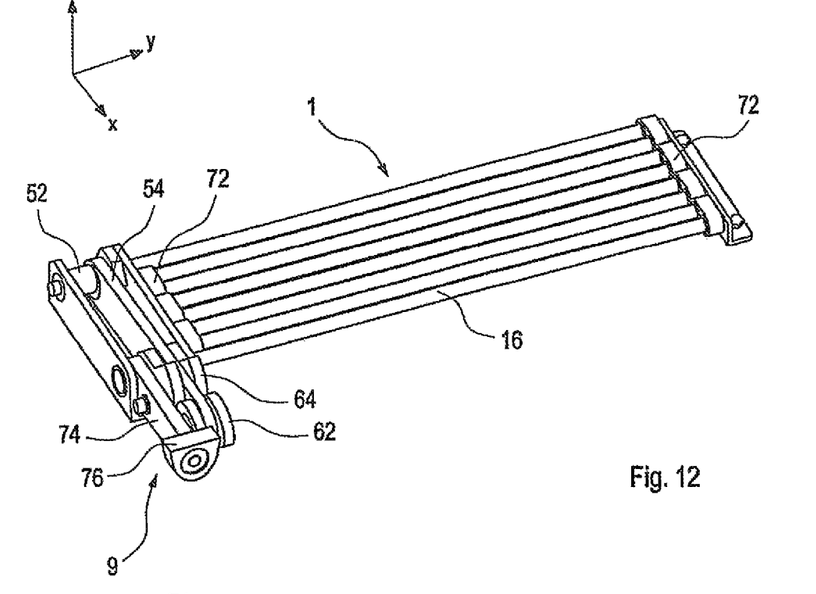
FIG. 12 is a perspective view of a fifth embodiment of a torsion bar spring system for a motor vehicle according to the invention.

FIG. 12 shows an additional torsion bar spring system 1 of which the operating principle matches that of the torsion bar spring system 1 described with respect to FIG. 8. However, the torsion bar spring system 1 according to FIG. 12 has eight parallel torsion bar springs 16 per hinge lever. The length of a single one of the eight parallel torsion bar springs 16 is dimensioned in such a way that each one of the torsion bar spring systems extends as far as the center of the motor vehicle in the direction of the transverse axis y of the vehicle. In each case, two adjacent torsion bar springs 16 at a time are connected together at their ends by means of a coupling element 72. The torsion bar spring 16, which is connected in a rotationally rigid manner to the cam plate 64, is designed for moving a pivot arm 74, which is in sliding contact with the rear hatch when said rear hatch is moved. To this end, the pivot arm 74 has a sliding block 76.

Figure 13:
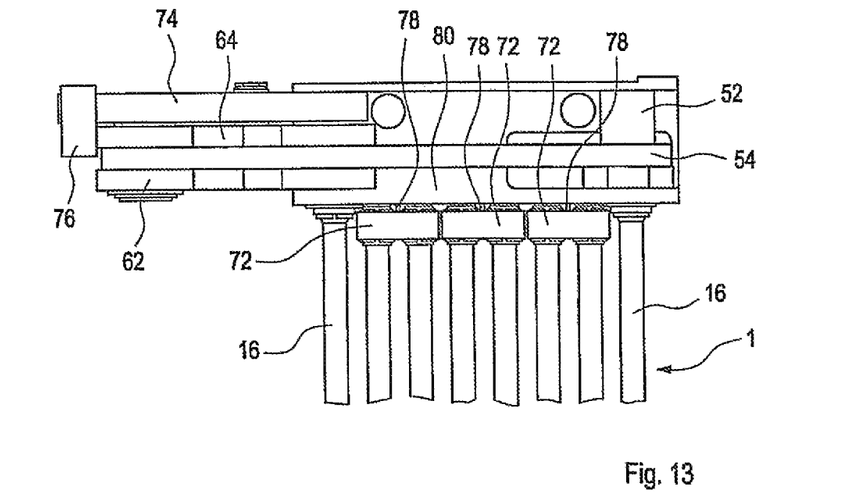
FIG. 13 is a partially cut top view of a detail of the torsion bar spring system according to FIG. 12.

FIG. 13 is a top view of a section of the torsion bar spring system 1 according to FIG. 12. In this case, it is clear that the coupling elements 72 are connected to a holder 80 by means of holding bars 78. Owing to the holding bars 78, the coupling elements 72 are secured against a movement in the vertical direction z of the vehicle. In addition, the holder 80 has the bearings for the eccentric cam 52; the torsion bar spring 16, which is connected in a rotationally rigid manner to the cam plate 64; the thrust element 54; and the pivot arm 74.

Figure 14:
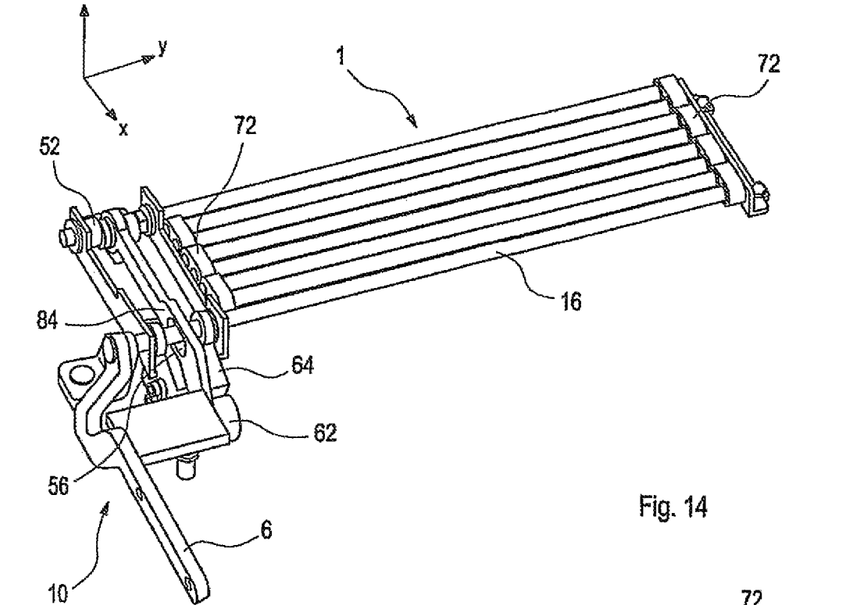
FIG. 14 shows a sixth embodiment of a torsion bar spring system for a motor vehicle according to the invention.

FIG. 14 shows an additional torsion bar spring system 1 having a function that corresponds to that of the torsion bar spring system 1 described with respect to FIG. 12. Only one thrust element 84, exhibiting an oblong hole 56, is configured so as to be bent and, as a result, can be integrated in an especially easy way into the roof cross member of the motor vehicle. In the roof cross member, the body of the motor vehicle slopes off in, the direction of the rear hatch 3. Furthermore, the torsion bar spring system 1 according to FIG. 14 has a hinge lever 6, which is connected to the torsion bar spring 16. Furthermore, the cam plate 64 is mounted in a rotationally rigid manner on the torsion bar spring 16.

Figure 15:
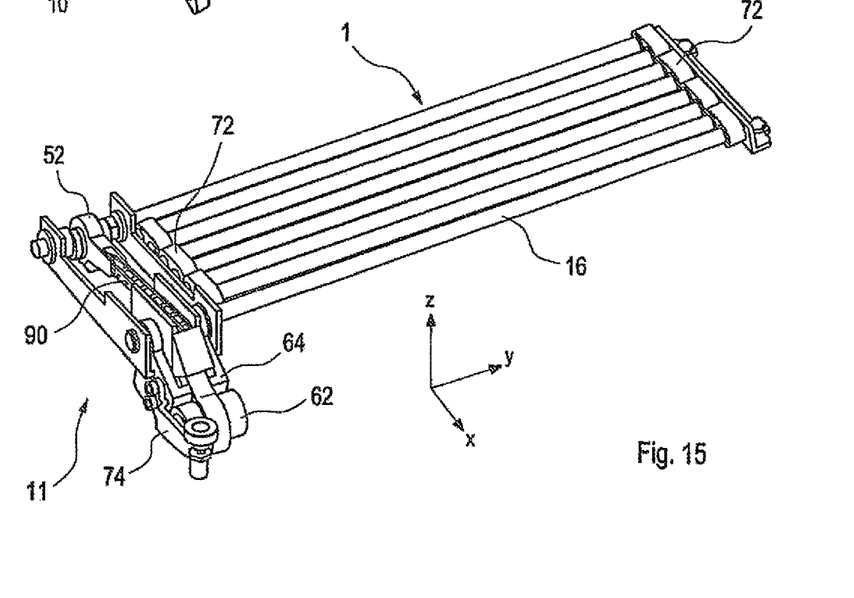
FIG. 15 shows a seventh embodiment of a torsion bar spring system for a motor vehicle according to the invention.

According to FIG. 15, an additional torsion bar spring system 1 has, instead of the thrust element 54, 84, a chain pull 90. After the roller 62 rolls on the cam plate 64, it is possible to exert a variable degree of pull on the eccentric cam 52 by way of the chain pull 90 and, in so doing, reduce a prestress of the torsion bar springs 16 that are coupled together.

In the present case, the rear hatch 3 has a length of 1.30 to 1.40 m perpendicularly to the axis of rotation A. In order to bring such a comparatively long and comparatively heavy rear hatch 3 having a weight of up to 40 kg from the closed position into the open position against the force of gravity, the torsion bar spring systems 1 provide torsional moments in a magnitude of more than 200 Nm. The engineering objective of the described torsion bar spring systems 1 is to keep this especially long and heavy rear hatch 3 largely in balance over its entire opening path, even if the motor vehicle is not on a level with the ground, but rather standing on a road exhibiting an incline or a gradient. In this case the torsion bar spring systems 1 allow the torsional moment that is provided by said torsion bar spring systems on the rear hatch 3 to mike an especially accurate adjustment, at the moment applied by the rear hatch 3 in the course of pivoting the same.

The invention claimed is:

1. An assembly affecting the opening and closing motion of a panel pivotally mounted about a transverse axis on the body of a vehicle, comprising;
   a plurality of transversely disposed, prestressed springs mounted on said vehicle body, operatively interconnected to provide opposed torsional motion at the ends thereof;
   first means operatively interconnecting one end of said springs and said panel for imposing a pivotal biasing force on said pivotal arm to urge said panel in a first direction; and
   second means operatively interconnecting the other end of said springs and said pivotal arm of said panel for imposing an opposed biasing force on said pivotal arm to urge said panel in a direction opposed to said first direction.

2. The assembly of claim 1 wherein said first means comprises an arm member connected to said one end of said springs and pivotal about the axis thereof.

3. The assembly of claim 2 wherein said second means comprises a linear thrust member pivotally connected at one end thereof to an arm member disposed radially relative to the axis of the other end of said springs, and rotatably connected to a roller disposed at another end thereof, bearing on a cam surface of a member mounted on and pivotal with said one end of said springs.

4. The assembly of claim 3 wherein said linear thrust member is provided with a longitudinal slot which receives therein a guide portion of said one end of said springs.

5. The assembly of claim 3 wherein said member provided with said cam surface and said arm member connected to said panel are radially fixed to a portion of said one end of said springs.

* * * * *